US006526670B1

United States Patent
Carli (10) Patent No.: US 6,526,670 B1
(45) Date of Patent: Mar. 4, 2003

(54) SYSTEM FOR DETECTING LINEAR DIMENSIONS OF MECHANICAL WORKPIECES, WITH WIRELESS SIGNAL TRANSMISSION UNITS

(75) Inventor: Carlo Carli, Ferrara (IT)

(73) Assignee: Marposs Societa' per Azioni, Bentivoglio (IT)

( * ) Notice: Subject to any disclaimer, the term of this patent is extended or adjusted under 35 U.S.C. 154(b) by 0 days.

(21) Appl. No.: 09/959,867

(22) PCT Filed: May 5, 2000

(86) PCT No.: PCT/EP00/04052

§ 371 (c)(1),
(2), (4) Date: Nov. 9, 2001

(87) PCT Pub. No.: WO00/70298

PCT Pub. Date: Nov. 23, 2000

(30) Foreign Application Priority Data

May 13, 1999 (IT) .................................... BO99A0249

(51) Int. Cl.⁷ .............................................. G01B 21/04
(52) U.S. Cl. .......................................... 33/503; 33/558
(58) Field of Search ..................... 33/503, 556, 558, 33/559, 561

(56) References Cited

U.S. PATENT DOCUMENTS 4,670,989 A * 6/1987 Juengel ...................... 33/558
4,978,857 A * 12/1990 Juengel ...................... 33/561
5,056,049 A 10/1991 O'Neill
5,778,550 A * 7/1998 Carli et al. .................. 33/503
6,370,789 B1 * 4/2002 Madlener et al. ............. 33/561

FOREIGN PATENT DOCUMENTS

| GB | 2141364 | 12/1984 |
|---|---|---|
| JP | 60202302 | 10/1985 |
| JP | 04030949 | 2/1992 |
| JP | 07055451 | 3/1995 |

* cited by examiner

Primary Examiner—G. Bradley Bennett
(74) Attorney, Agent, or Firm—Dickstein Shapiro Morin & Oshinsky LLP (57) ABSTRACT

A system for detecting linear dimensions of mechanical workpieces includes a checking probe with detecting devices, a power supply and a remote transceiver unit. A stationary transceiver unit is located at a distance from the probe, and is adapted for wireless receiving and transmitting to the remote transceiver unit signals, for example, coded optical signals. The stationary unit transmits activation and/or deactivation signals to the probe for controlling the full power supply of the probe circuits, and/or the return to a "stand-by" power state. The remote transceiver unit includes devices adapted for achieving an automatic sensitivity control and other attenuation devices for preventing unwanted consumption of the probe battery energy due to noise signals. Such noise signals could come from fluorescent lamps, for example, causing improper activation and deactivation of the probe circuits.

23 Claims, 8 Drawing Sheets

PRIOR ART

SYSTEM FOR DETECTING LINEAR DIMENSIONS OF MECHANICAL WORKPIECES, WITH WIRELESS SIGNAL TRANSMISSION UNITS

TECHNICAL FIELD

The present invention relates to a system for detecting linear dimensions of a workpiece, including a checking probe with detecting devices, a power supply connected to the checking probe, a remote transceiver unit, integral with the probe, connected to the detecting devices and to the power supply, and adapted for wireless transmitting signals indicative of the state of the probe, and a stationary transceiver unit, adapted for wireless transmitting activation signals to the formerly mentioned remote unit, wherein the remote transceiver unit includes receiving devices adapted for receiving the wireless transmitted signals, a processing section, connected to the receiving devices, and to the power supply and adapted for generating an enable signal, the processing section including at least an amplifier connected to the receiving devices for outputting an amplified signal, a switching unit connected to the processing section and to the power supply, and additional sections, with generating and transmitting circuits, connected to the switching unit, the switching unit being adapted for receiving the enable signal and, on the basis of this signal, controlling the power supply of at least some of the additional sections.

BACKGROUND ART

There are known measuring systems as, e.g. systems in numerical control machine tools, for detecting the position and/or the dimensions of machined workpieces by a contact detecting probe, mounted in the machine, that, in the course of a checking cycle, displaces with respect to the workpiece, touches the surfaces to be checked and responds to contact by wireless transmitting signals to a receiving unit, usually located at a certain distance from the probe.

The receiving unit is in turn connected, by means of an interface device, to the numerical control unit that, by processing other signals indicative of the spatial position of the probe, provides information about the position of the workpiece surfaces.

The contact detecting probe can include electric batteries for the power supply of contact detecting circuits and the wireless transmission devices. The wireless transmission can take place, for example, by emitting electromagnetic signals of optical or radio-frequency type. Since the probe is utilized just for short time intervals during the machining cycle of the machine tool, the associated detecting circuits and transmission devices are normally kept in a "stand-by" state of low power consumption and powered-up only when there is the need to perform a checking cycle. The switching from the "stand-by" state to the full "powered-up" state can be accomplished by controlling suitable switching devices on the probe by means of activation signals wireless transmitted by the receiving unit. When the measuring cycle ends, the probe circuits return to the "stand-by" state of low power consumption either by wireless transmitting a suitable deactivation signal, or, as an alternative, after a predetermined time period has elapsed.

U.S. Pat. No. 4,779,319 discloses a measuring system with these characteristics and more specifically it describes a checking probe with circuits for transmitting optical signals in the infrared band. An infrared radiation flash is utilized for activating the probe, in other words for controlling the full power-up of the probe detecting circuits and the transmission devices.

The probe circuits for receiving the optical activation signal and controlling the connection to the batteries include a receiver diode and a coil that, among other things, serves as a high pass filter for reducing the negative effects due to the steady state and/or low frequency components of the environment illumination and for excluding from subsequent processings low frequency pulses emitted, for example, by fluorescent lamps located in the probe environment.

However, it may occur that the fluorescent lamps, or other sources of light, emit electromagnetic radiations with frequencies in the same band as the activation or deactivation signals (or, more specifically, the associated modulating signals) and that these radiations cause the unwanted activation of at least some of the probe circuits, and a useless consumption of the battery supply energy, or the unwanted deactivation in the course of a checking cycle and imaginable negative consequences.

A fluorescent lamp can emit improper and unforeseeable radiations, even in the infrared radiation band, that vary depending on the type of lamp, on the environment temperature, on the power supply voltage, on the age and the efficiency conditions of the lamp itself.

Another possible way for probe optical activation (or deactivation) foresees, as an alternative to the pulse signal described in patent U.S. Pat. No. 4,779,319, an infrared radiation signal modulated as a sequence of pulses of a given frequency (for example, about ten KHz) and transmitted to the receiving unit for a determined time period (for example, a few tenths of a second). The probe circuits include a logic section—that is powered when there is detected a signal of sufficient intensity—that checks whether the received signal has the required frequency and minimum duration (a number of pulses generally by far smaller than those actually transmitted) of the activation (or deactivation) signal and that, in the affirmative, causes the power-up of the other probe circuits (or the return to the stand-by state).

The intensity of the radiations randomly emitted by the fluorescent lamps in the frequency band of the activation signal can be sufficient for causing the frequent and needless power-up of the logic section of the probe circuits, and consequently unwanted consumption of the battery energy. Furthermore, while the logic section is improperly powered, it may occur that a sequence of pulses be sent by a fluorescent lamp whose frequency and duration are the same as those of the activation signal. It may also occur that, while the probe is performing a checking cycle, the logic section detects a sequence of pulses having frequency and duration that match those of the deactivation signal, without the latter signal having actually been transmitted by the receiving unit.

DISCLOSURE OF THE INVENTION

Object of the present invention is to overcome the inconveniences, in terms of consumption of the battery supply energy and undesired probe activation or deactivation, caused by fluorescent lamps, or by other sources emitting electromagnetic radiations in the probe environment.

This and other objects are achieved by a system in which the processing section of the remote transceiver unit includes attenuation devices adapted for inhibiting the generating of the enable signal on the basis of attributes of the signal that the receiving devices have wireless received, the attenuation devices including elements of a feedback circuit for attenuating the intensity of said amplified signal.

BRIEF DESCRIPTION OF THE DRAWINGS

The invention is hereinafter described in detail with reference to the enclosed sheets of drawings, given by way of non limiting example only, wherein.

BEST MODE FOR CARRYING OUT THE INVENTION

Figure 1:
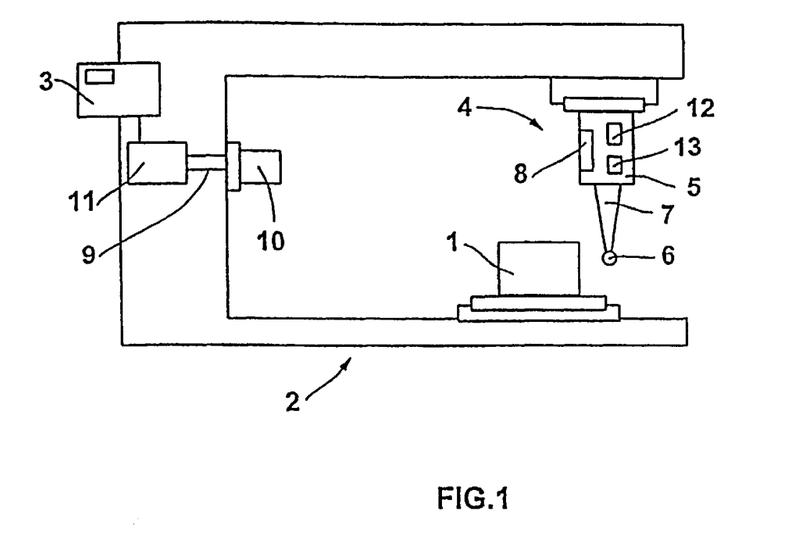
FIG. 1 is a schematic view of a machine tool on which there is mounted a checking probe for detecting linear dimensions of mechanical pieces.

FIG. 1 illustrates, in simplified form, a system for detecting linear dimensions of a piece 1 on a machine tool, for example a machining center identified in the drawing by reference number 2, where piece 1 is machined. The system includes a computerized numerical control 3, for controlling the operation of machine tool 2, and a detecting apparatus including a checking probe 4. The latter, for example a contact detecting probe, has a support and reference portion 5 coupled to slides of machine tool 2, a feeler 6 and an arm 7 carrying feeler 6 and movable with respect to support portion 5. Moreover, probe 4 includes detecting devices, for example a microswitch 13, a power supply with a battery 12 and a remote transceiver unit 8 for transmitting infrared optical signals to and receiving infrared optical signals coming from a stationary transceiver unit 10, located at a distance from probe 4.

The stationary transceiver unit 10 is connected, through a cable 9, to an interface unit 11, in turn connected to the computerized numerical control 3. The stationary transceiver unit 10 has the function of transmitting coded optical signals to the remote transceiver unit 8 associated with the probe 4, for activating and deactivating probe 4 in response to the reception of a request sent by numerical control 3 through the interface unit 11, and receiving, from remote unit 8, coded optical signals including information about, for example, the spatial position of feeler 6 with respect to support portion 5, or the level of charge of battery 12 of probe 4. The terms activation/deactivation mean the switching of the power supply of probe 4 from/to a "stand-by" state in which just some low consumption sections of the remote transceiver unit 8 are powered, to/from a state of "full" power-up of unit 8.

Figure 2:
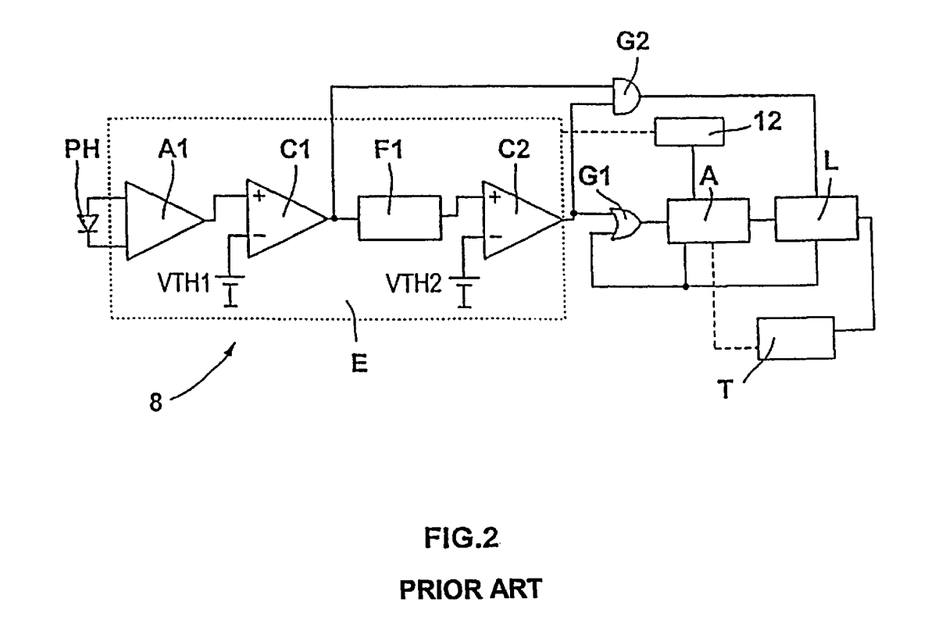
FIG. 2 is a diagram including some blocks of a known transceiver unit of coded optical radiations.

FIG. 2 is a block diagram showing some parts of a remote transceiver unit 8 of a known type. It includes receiving devices with a photodiode PH, adapted for receiving the periodic optical signals sent by stationary unit 10, and generating an alternating signal (for example a current), a processing section E, and further sections, with a logic processing unit (or "logic") L and circuits for generating and transmitting optical signals. The latter circuits are schematically shown in FIG. 2 by the block identified by letter T, and are achieved in a known way that is not of specific interest to this invention.

In turn, the processing section E, connected to battery 12 and characterized by a very low consumption of current, includes an amplifier A1 connected to photodiode PH for generating a signal—for example a periodic signal and more specifically an alternating voltage VA1—, and a comparator C1, for comparing the amplitude of signal VA1 with a first threshold value VTH1 for generating a signal VC1 consisting of a sequence of pulses with frequency and duration that correspond to those of the periodic signal that stationary unit 10 sends to photodiode PH. Furthermore, processing section E also includes a filter F1 with its input connected to comparator C1, and its output connected to a second comparator C2, the latter comparing signal VF1 provided by filter F1 with a second threshold value VTH2. Furthermore, remote transceiver unit 8 includes a circuit G1 that achieves a logic OR, a circuit G2 that achieves a logic AND and a switching unit A connected to battery 12, to logic L and to circuits T.

When photodiode PH receives an optical signal arriving from stationary transceiver unit 10, it generates a signal that is amplified by amplifier A1 (VA1 in FIG. 3), and is compared with threshold value VTH1 by comparator C1. When the amplitude of signal VA1 is smaller than threshold VTH1, output VC1 of comparator C1 is at low logic level, while it switches to high logic level when the amplitude of signal VA1 exceeds threshold VTH1. The processed signal VC1, provided by comparator C1 and sent to the input of low pass filter F1, is a sequence of pulses having the same frequency and duration (i.e. number of pulses) as the signal transmitted to photodiode PH. The signal VF1, at the output of filter F1, is then compared by comparator C2 with the threshold value VTH2. When signal VF1, outputted by filter F1, exceeds threshold value VTH2, enable signal VC2, outputted by comparator C2, switches from low to high logic level and, through the logic OR G1, enables (VG1) switching unit A to connect battery 12 to logic L in order to provide the latter with the power supply voltage VA.

The high logic level of signal VC2, through the enable device achieved by means of the logic AND G2, also enables the transmission of the processed signal VC1 to logic L, for checking the frequency and the duration of the signal VC1 and, consequently, of the signal received by photodiode PH. If the detected frequency and duration (i.e. the minimum number of pulses) correspond to those of the activation signal, logic L places the signal VL at high logic level for controlling switching unit A to power supply the generating and transmitting circuits T and concurrently, through logic OR G1, keeps logic L powered even after the activation signal ends and signal VC2 switches to low logic level.

Logic L brings signal VL back to low logic level when the photodiode PH receives a deactivation signal, that logic L recognizes by identifying the frequency and the duration (minimum number of pulses) of the corresponding signal VC1.

As an alternative, the switching of signal VL to low logic level can be controlled when the time set in a timer, achieved in a known way in logic L and not shown in the figures, elapses. When signal VL switches to the low logic level, switching unit A is actuated for inhibiting the power supply of circuits T and, when the received signal is no longer present, logic L.

Figure 3:
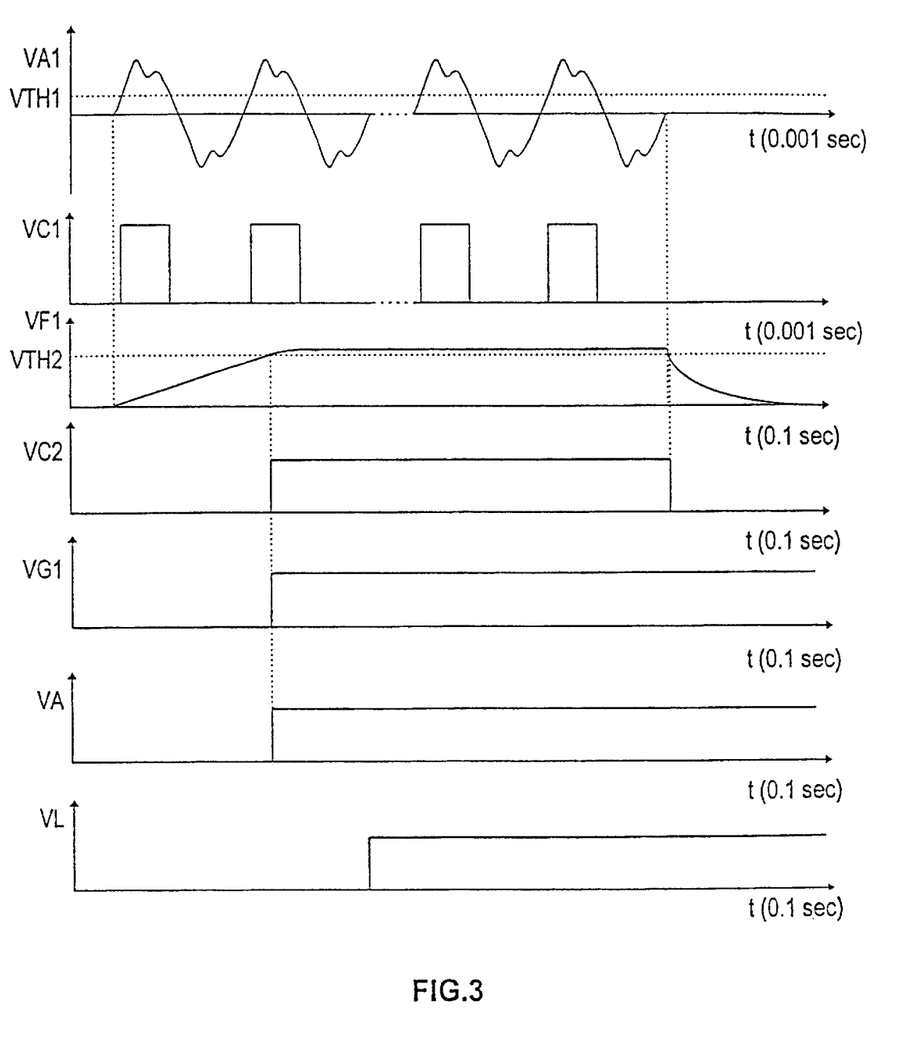
FIGS. 3 and 4 show the trends of some of the signals generated in the transceiver unit of FIG. 2 on the arrival of a probe activation signal or a noise signal.

FIG. 3 shows the trends of the above mentioned signals when the circuits of probe 4 are in a stand-by state and photodiode PH receives an activation signal transmitted by stationary unit 10. It should be realized that, for the sake of clarity, the unit of division of the time scale in the first two graphs in FIG. 3, relating to signals VA1 and VC1, is of approximately two order: of magnitude smaller than the unit of division of the other graphs (for example: one millisecond in the first two graphs, as compared to one tenth of a second in the other graphs). In this connection, it should be realized that the dimensioning of filter F1, and more particularly its associated time constant RC1, is such that signal VF1 reaches and exceeds threshold value VTH2 of comparator C2 only after a sequence of some hundredths of pulses of signal VC1. In practice, the stationary transceiver unit 10 transmits an activation (or deactivation) signal with a very high number of pulses (in the range of some thousandths), and logic L must identify just a limited sequence thereof (normally just a little more than about ten pulses). For the same reason, the first two graphs of FIG. 3, specifically those relating to signals VA1 and VC1, have interruptions.

The function of filter F1 and comparator C2 is to power supply logic L only when the mean value of signal VC1 outputted by comparator C1 or, more specifically, its "duty-cycle" (i.e., the ratio between the time—within a cycle—in which said signal assumes a high logic level and the duration of the whole cycle), exceeds a specific value in a rather long time interval, thereby monitoring that photodiode PH has received a signal that exceeds the minimum predetermined values in terms of intensity and duration. In this way it is possible to prevent a needless consumption of the battery supply energy when there are pulse optical noises or activation signals that are too weak for being correctly processed by logic L.

In the event that fluorescent lamps, or other sources of electromagnetic waves near probe 4, emit accidental and unforeseeable infrared radiations, the intensity and duration of such radiations can be sufficient for keeping logic L powered up for long periods (i.e. VA remains at high logic level), and cause a consequent considerable increase in the consumption of energy of battery 12.

Figure 4:
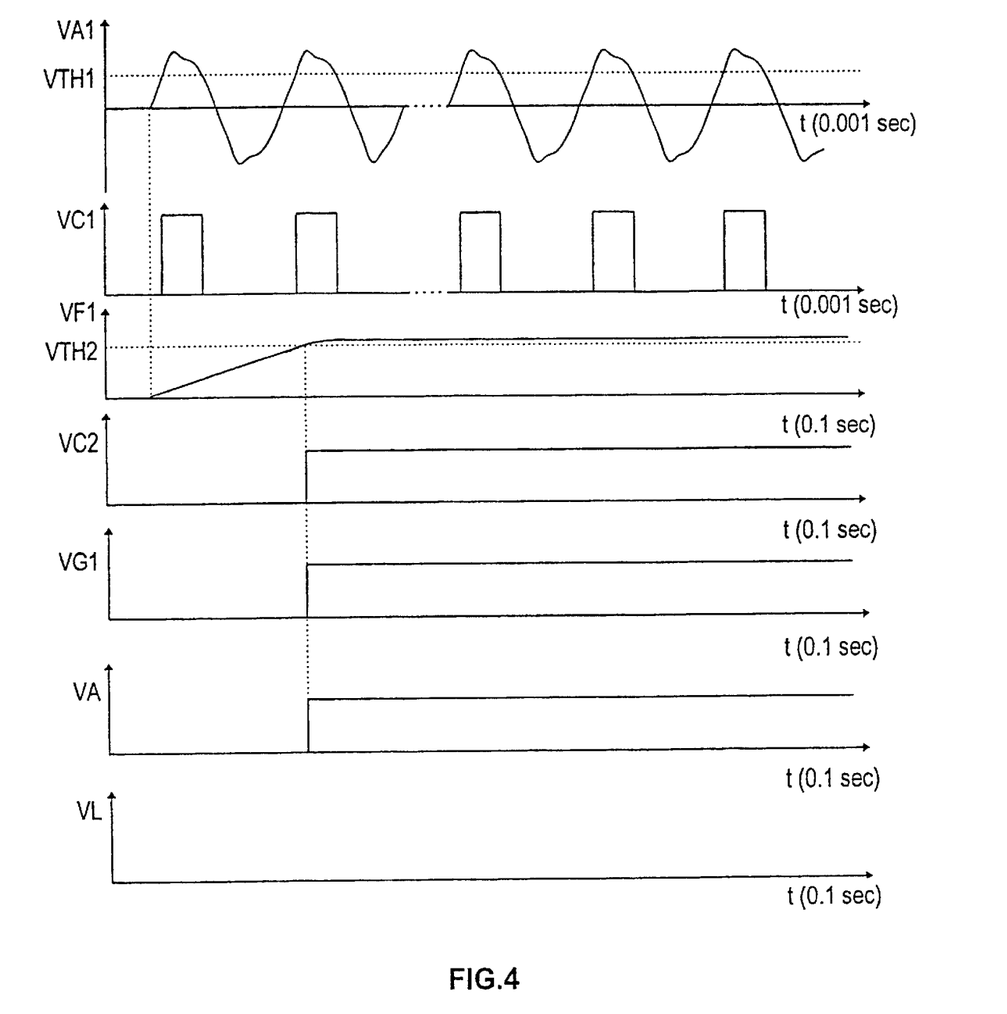

FIG. 4 shows the trends of the same signals that are shown in FIG. 3, under the circumstance wherein photodiode PH receives a signal that is not identified by logic L as an activation/deactivation signal (for example, a noise signal, the end of which is not shown in FIG. 4).

These signals have the same trend as those previously shown, but in this case, signal VL, outputted by the logic L, remains at low logic level. According to what is shown in FIG. 4, when the intensity of the signals received by photodiode PH remains greater than a predetermined value logic L remains powered for identifying the frequency and the duration of the received signal. As a consequence, there is a consumption of energy of battery 12 even at times when the circuits could remain in a stand-by state.

Figure 5:
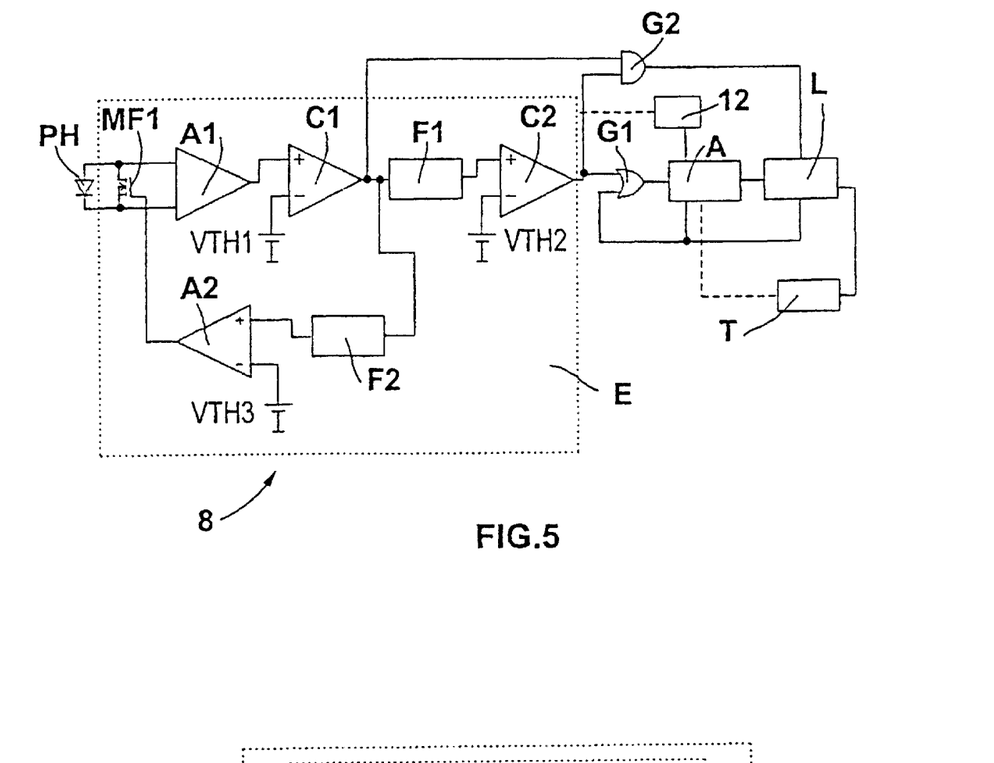
FIG. 5 is a diagram including some blocks of a transceiver unit of coded optical radiations, according to a first embodiment of the invention.

FIG. 5 is a block diagram showing some parts of a remote transceiver unit 8 according to a first embodiment of the invention.

The processing section E includes, in addition to the components described with reference to FIG. 2, attenuation devices that achieve an automatic sensitivity control and that, in the illustrated example, include elements of a feedback circuit, more specifically an additional low pass filter F2, the input of which is connected to the output of comparator C1, an additional amplifier, for example a differential amplifier, A2, connected to the output of filter F2, and a field effect transistor, or MOSFET (Metal Oxide Semiconductor Field Effect Transistor) MF1 of the enhancement mode type that achieves an attenuation device. The zones of transistor MF1 known as "gate", "source" and "drain" are connected to the output of amplifier A2 and at the ends of photodiode PH, respectively.

The signal VC1, outputted by comparator C1, is sent to the input of filter F2 that, as more detailedly described hereinafter, also provides a delay generator, having a time costant RC2 longer than that (RC1) of filter F1. The output signal VF2 is compared with a threshold value VTH3, lower than VTH2, and amplified for providing a signal, more particularly a voltage VA2 that is sent to the gate of transistor MF1. Voltage VA2 controls, in an analogue or continuous way, the conduction of transistor MF1 and the consequent, partial, attenuation of the signal generated by photodiode PH that reaches amplifier A1. As hereinafter more clearly explained, this portion of the circuit prevents noise signals— with intensity and duration equal to or greater than those of an activation signal—arriving for example from a fluorescent lamp, from causing the unwanted and prolonged power supply of logic L.

Figure 6:
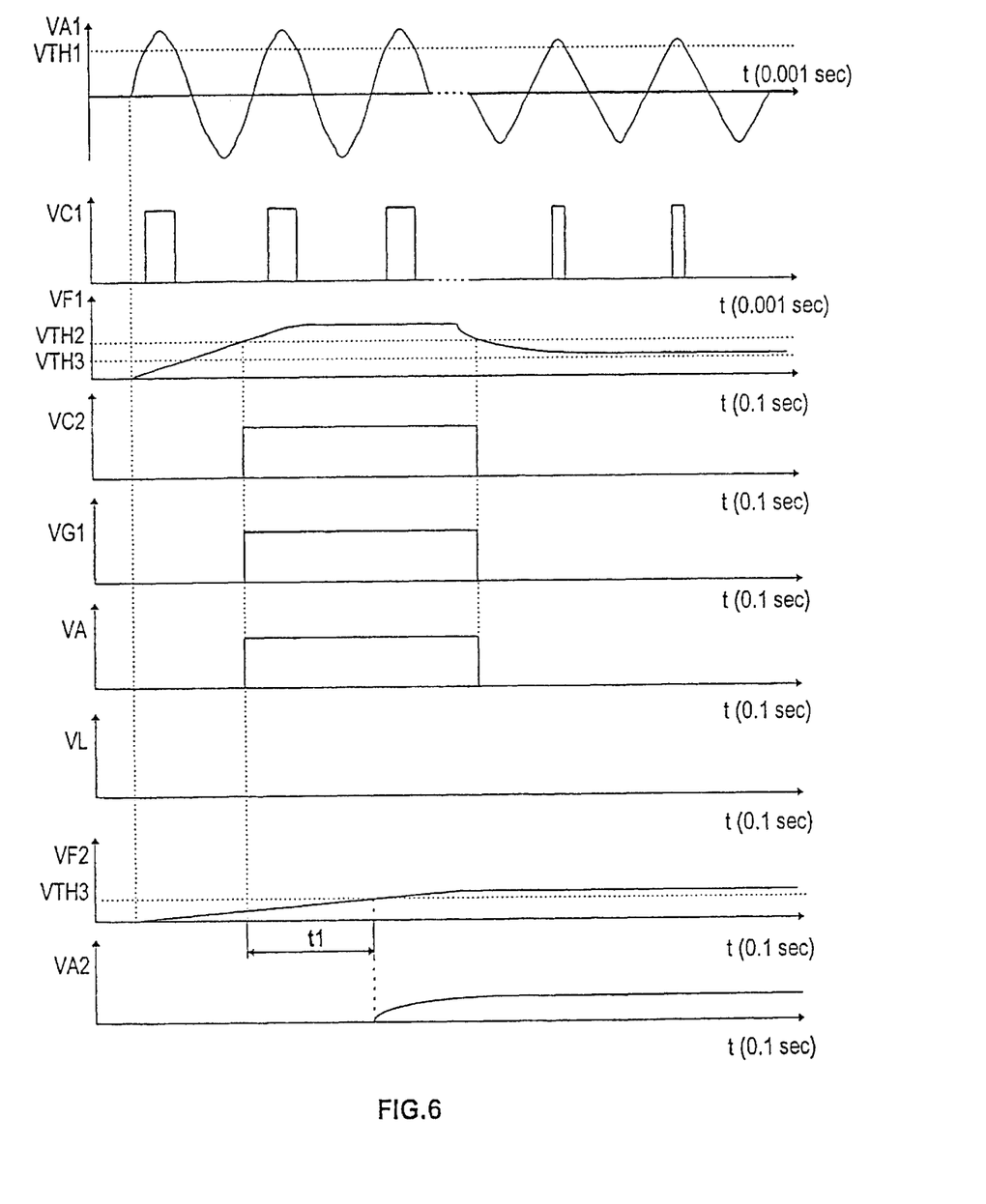
FIGS. 6, 7 and 8 show the trends of some of the signals generated in the transceiver unit of FIG. 5 on the arrival of a noise signal, an activation signal or a deactivation signal.
Figure 7:
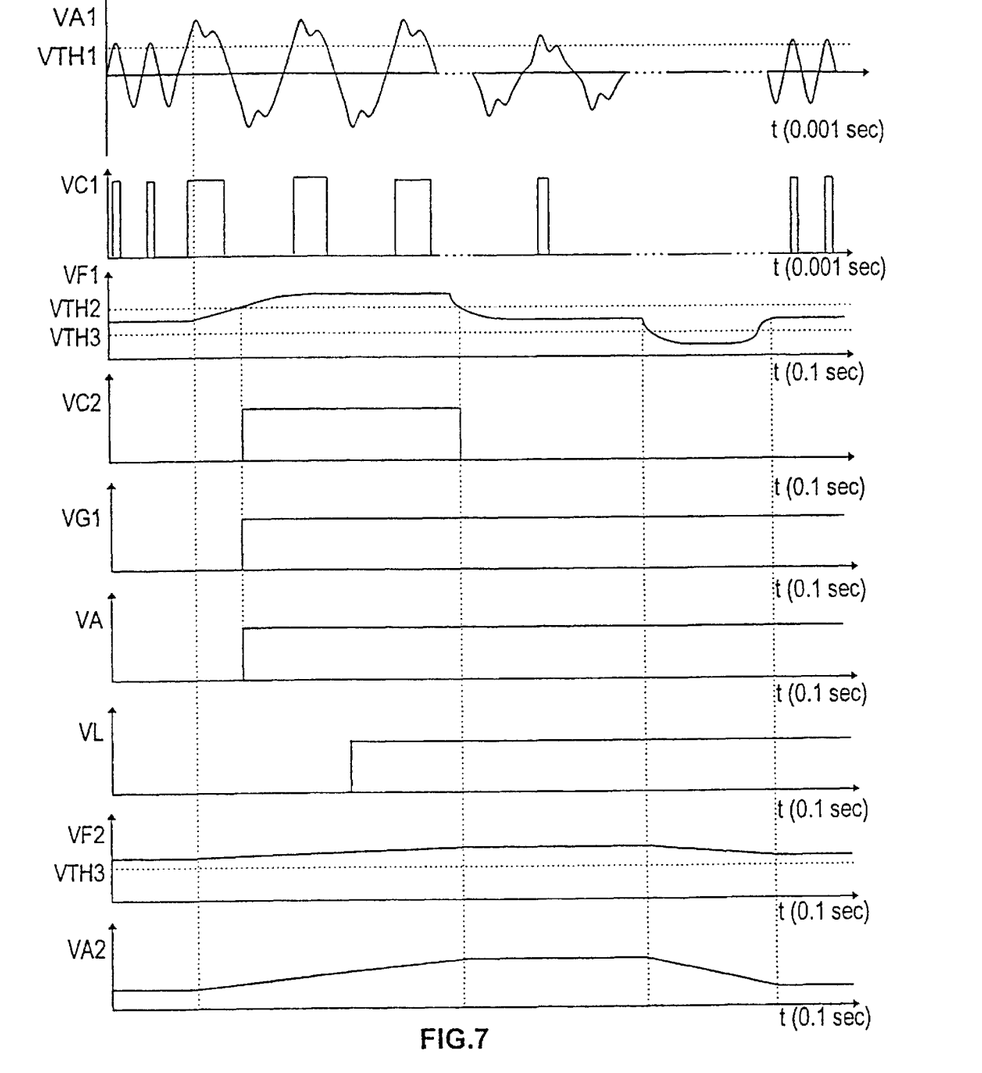
Figure 8:
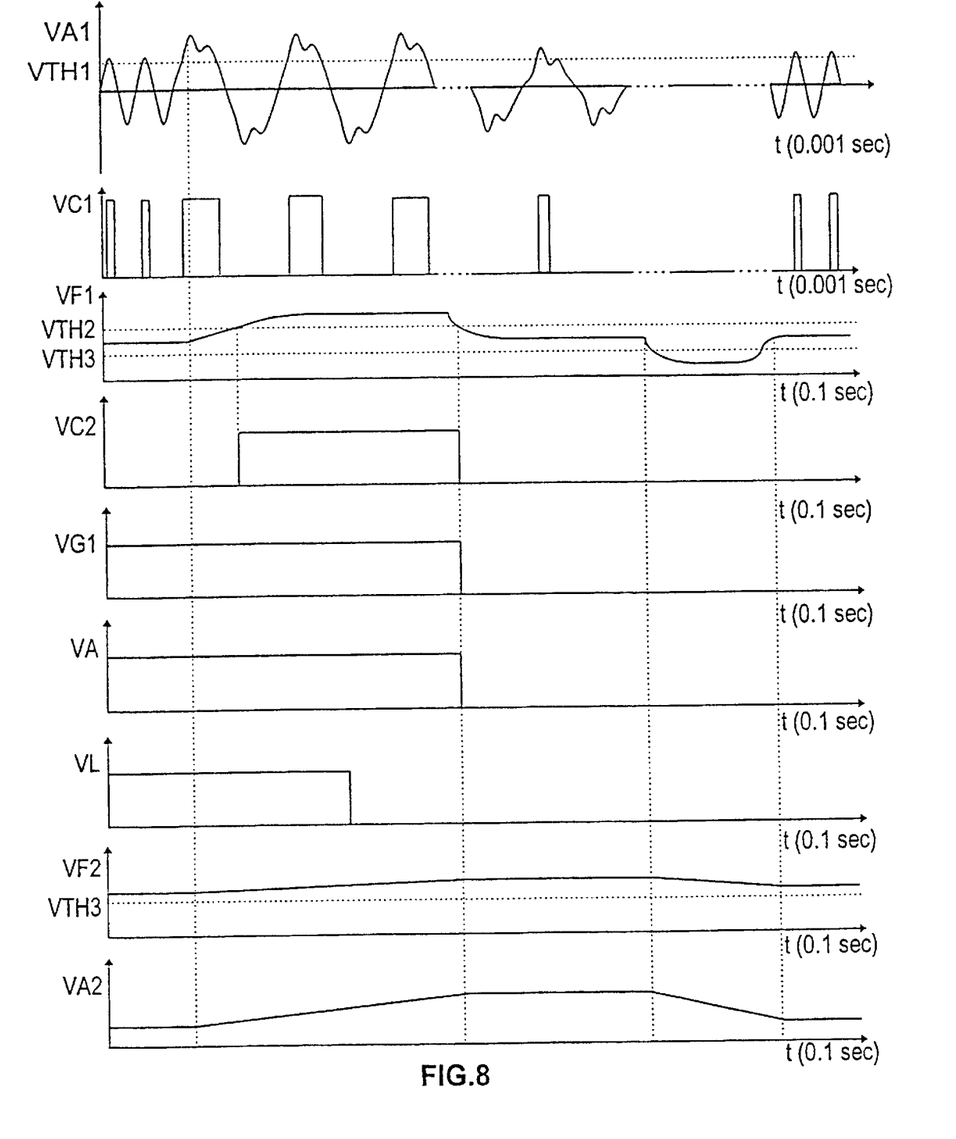

The operation of the circuit shown in FIG. 5 is now explained with reference to FIGS. 6, 7 and 8 that illustrate the trend of the signals in three different circumstances. In FIGS. 6, 7 and 8 too, for the sake of simplicity and clarity, the graphs representing signals VA1 and VC1 have interruptions and a different time scale with respect to the other graphs.

By assuming that, at a specific moment in time, transistor MF1 is substantially held off (i.e. voltage VA2 is held at low level)—because photodiode PH has not received any previous signals—and the circuits are in a stand-by state, the arrival of a signal with sufficient intensity and duration received by photodiode PH generates a sequence of pulses VC1 (see FIG. 6) that, initially, is similar to the sequence of FIG. 4.

The signal VC1 is sent to both filters F1 and F2 and, because filter F1 has a time constant lower than that of filter F2, before value VF2 reaches threshold VTH3, the power supply of logic L is enabled and so is the checking of the frequency and the duration of sequence VC1: if the signal that photodiode PH has received and, as a consequence, signal VC1 do not have the attributes in terms of frequency and duration (minimum number of pulses) of an activation signal, signal VL remains at low logic level and the circuits T for generating and transmitting optical signals are not powered.

When signal VF2 reaches the threshold value VTH3 after a limited delay time t1 (for example, a few tenths of a second) and, after another very short delay time, the voltage level of the signal VA2 provided by amplifier A2 is sufficiently high, transistor MF1 starts to conduct, thereby causing an attenuation of the voltage across source and drain.

Therefore, as soon as transistor MF1 starts to conduct, the amplitudes of the signals at the input and at the output of amplifier A1 are reduced. As a consequence, the duty-cycle of signal VC1, outputted by comparator C1, reduces owing to the fact that the time intervals in which the amplitude of VA1 exceeds the threshold value VTH1 become shorter. Thus, output voltage VF1 of filter F1 decreases and stabilizes at a value that is slightly higher than the threshold value VTH3 (and thus lower than the value of VTH2). The output voltage VF2 also stabilizes at this value so as to keep voltage VA2 sufficiently high, and thus the voltage at the input of amplifier A1 suitably attenuated. When the value of voltage VF1 becomes lower than the threshold value VTH2 of comparator C2, the value of signal VC2 switches to low logic level and, if an activation signal has not been identified in the meantime, the power supply VA of logic L is inhibited and remains so as long as the noise signals persist (or when these signals stop), thereby preventing a needless consumption of the energy of battery 12. conversely, if the activation signal is in the meantime identified, the subsequent switching of the value of signal VL to a high level ensures the maintaining of the full power supply.

FIG. 7 shows the trend of the signals when a proper activation signal is sent to photodiode PH together with noise signal, as those referred to in FIG. 6. It is assumed that when the proper activation signal is received by photodiode PH, the value of voltage VA2 and the conduction of transistor MF1 are sufficient or keeping the circuits in a stand-by state, thanks to the previously described performance.

The arrival of the activation signal—that overlaps the noises and has an intensity that is sharply greater than that of the noises—causes an abrupt increase in the amplitude of the signal generated by photodiode PH and in the amplitude of the amplified signal VA1. Notwithstanding the attenuation effect of transistor MF1, the duty-cycle of the sequence of pulses VC1 output by comparator C1 increases, signal VF1, outputted by filter F1, exceeds the threshold value VTH2 and signal VC2 switches to high logic level, thereby enabling the power supply of logic L and the checking of the frequency and duration attributes of the received signal. The value of signal VF2, output by filter F2, also slightly increases, but more slowly, thanks to the different time constant RC2, and the value of voltage VA2 increases in the same way. It should be noted that, unlike what has been shown for the sake of simplicity and clarity in FIG. 7, the variations of signal VA2 are of a definitely greater entity (that depends on the gain of amplifier A2) with respect to those of signal VF2. The increase in the value of voltage VA2 causes, through the action of transistor MF1, a greater attenuation of the signal of photodiode PH, that is sufficient for bringing the output of filter F1 back to a value that is just slightly higher than VTH3. However, before this takes place, signal VC2 remains at high logic level so as to enable the power supply for a time interval that is sufficient for permitting logic L to recognize the frequency and the duration attributes of the activation signal and switch the level of signal VL in order to maintain the power supply even after the decrease of signal VC2 as a consequence of the automatic sensitivity control.

It should be noted that, in the event the increase in the amplitude of the voltage generated by photodiode PH were also to be caused by an unwanted noise signal, for example owing to a sudden displacement between probe 4 and a fluorescent lamp, the consequent supply of logic L would be in any case of short duration (as the situation referred to in FIG. 6).

It should furthermore be noted that the trend of signal VF1, shown in FIG. 7, indicates a further decrease, below threshold VTH3, for a short time interval that follows the end of the activation signal, when there is still considerable attenuation, and the subsequent return to a value slightly higher than threshold VTH3 further to a drop (decrease of VF2 and VA2) of the attenuation, yet sufficient for "filtering" noise signals.

FIG. 8 represents the situation in which a deactivation signal is sent by stationary transceiver unit 10 in the following circumstances:

1) probe 4 is performing a checking cycle and thus there is full power supply to the circuits (VL is at high logic level), and
2) the noise signals received by photodiode PH cause the attenuation of the signal that photodiode PH generates in accordance with the previously described performance, thereby preventing the sequence of pulses VC1 from reaching logic L (VC2 is at low logic level).

The freshly input signal, the intensity of which is particularly high, overlaps the noises and causes an abrupt increase in the amplitude of the signal generated by photodiode PH. The performance shown in FIG. 8 is similar to that of the example shown in FIG. 7, and signal VC2 is switched to high logic level and remains so for a short period of time, before the signal of photodiode PH is suitably attenuated. In this case, the effect of the switching of signal VC2 is not that of altering the power supply of logic L (it is already powered thanks to the action of signal VL), but that of enabling—by means of the logic AND circuit G2—logic L to check the frequency and duration attributes of the freshly input signal. If, on the basis of these checks, there is identified a deactivation signal, the logic level of signal VL is switched from high to low in such a way so that, further to the subsequent decrease in the level of signal VC2 due to the attenuation effect, the power supply of logic L (and that of the circuits T for generating and transmitting optical signals) is inhibited. On the contrary, the checks end, when signal VC2 returns to low logic level, if the deactivation signal has not been identified.

Obviously the probability that, in the course of the short time intervals when VC2 is at high logic level, there be a noise signal with the frequency and duration attributes of an activation signal is extremely low. However, should this unlikely event occur, it could cause the undesired activation of probe 4, i.e. the undesired full power supply of its circuits.

In an identical (and equally unlikely) manner it could take place that, in the course of short time intervals when VC2 is at high logic level, there be the reception of a noise signal with the attributes of a deactivation signal that, identified as such, could interrupt the supply of power to the circuits of probe 4 while a checking cycle is taking place and cause foreseeable negative consequences.

By way of experiment it has occurred that, while the fluorescent lamps with electronic reactor emit noises 10 having considerably higher frequencies than the frequencies of the proper activation and deactivation signals, noises emitted by lamps with non-electronic reactor can have frequencies that are closer to those of the former proper signals. Typically the lamps of the second type emit noises with an intensity that periodically takes a value near zero for a relatively non negligible time interval (typically near a millisecond), as the power supply voltage periodically assumes the zero value.

Figure 9:
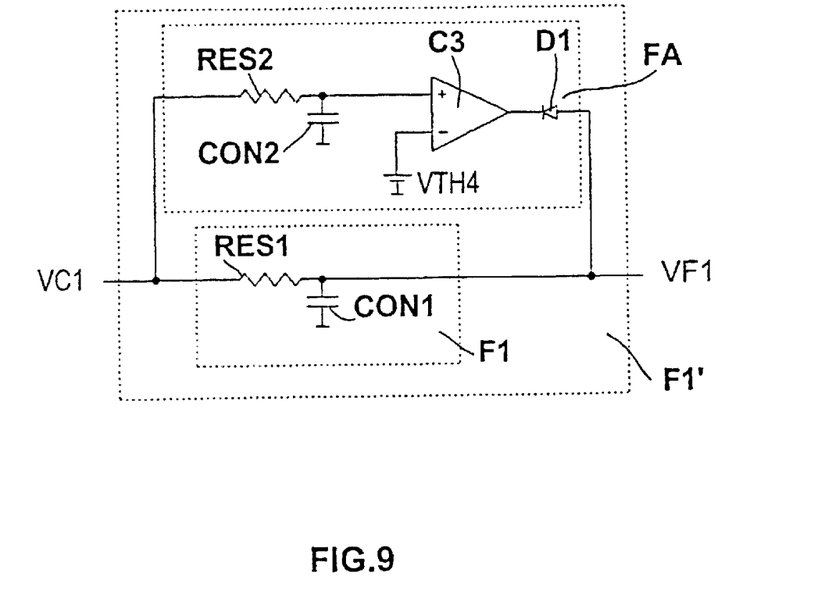
FIG. 9 is a circuit diagram of a component of the transceiver unit of FIG. 5, according to a different embodiment of the invention.

FIG. 9 schematically represents filter F1, shown in FIGS. 2 and 5, and additional attenuation devices with an additional filtering unit FA, connected in parallel to filter F1. Filter F and unit FA together achieve an "asiimetric" filter F1' that enables to solve the problem of undesired activations and deactivations of probe 4. Filter F1' includes two low pass filters, one (F1) consists of resistor RES1 and capacitor CON1 and the other consists of resistor RES2 and capacitor CON2. Moreover, unit FA includes a comparator C3, that compares the signal at its input with a threshold VTH4, and a diode D1, that, for the sake of simplicity in the description, is considered as ideal. The filter consisting of components RES2 and CON2 has a lower time constant with respect to that of filter F1.

On reception of a signal with suitable intensity and negligible interruptions, the signal outputted by the filter consisting of RES2 and CON2 increases more rapidly with respect to the one outputted by F1, until it exceeds threshold value VTH4 and switches the output of comparator C3 to high logic level. Thus diode D1 is turned off. In this case filter F1' substantially acts as filter F1, in other words in the manner described with reference to FIGS. 2 and 5. On the contrary, if the received signal has significant interruptions, at every interruption the value of the voltage at the input of comparator C3 falls below the value of VTH4, switching the output of comparator C3 to low logic level. Thus, diode D1 periodically conducts and enables the periodic discharge of capacitor CON1. As a consequence, signal F1 does not reach threshold value VTH2 and the power supply of logic L is not enabled and/or signal VC1 does not reach logic L. Therefore, the use of filter F1' in FIG. 9 in a circuit as the one of FIG. 2, or FIG. 5, prevents noise signals with significant interruptions, as those emitted by fluorescent lamps with non-electronic reactor, to cause the even temporary power supply of logic L or the even temporary enabling of the signal frequency checks. It should be realized that, as previously mentioned, these noise signals are, among the noises emitted by the fluorescent lamps, those which have frequency and regularity attributes that have a relatively higher probability (even though in absolute very low) of approaching the attributes of the activation and deactivation signals. Thus, as with the use of filter F1' the power supply of logic L is not even enabled for a limited time or, if the device is in the transmission phase, the checks of the signal frequency are not even enabled for a limited time, substantially there is no risk of possible unwanted activation/deactivation. Obviously, the presence of filter F1' in combination with the automatic sensitivity control enabled by the arrangement of FIG. 5 gives simultaneous protection against the noise signals both at lower frequencies (comparable with the activation/deactivation frequencies) and at higher frequencies (like those emitted by fluorescent lamps with electronic reactor), in the latter case enabling undesired power supply of just logic L for sporadic and very short intervals of time (typically shorter than half a second) that are substantially negligible in view of the correct consumption of energy of battery 12.

Figure 10:
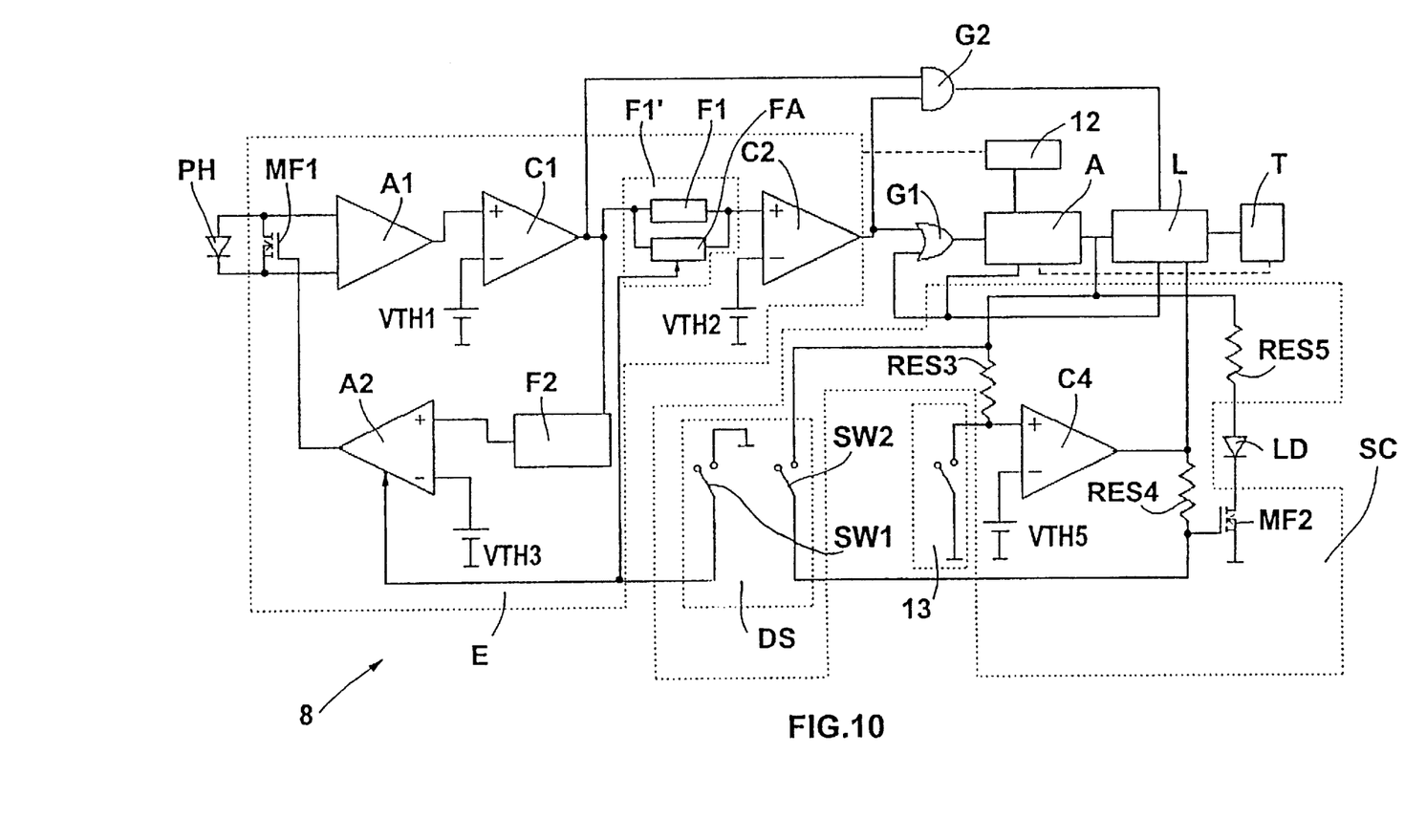
FIG. 10 is a schematic and partial view of a transceiver unit of coded optical radiations, according to a further embodiment of the invention.

FIG. 10 is a schematic and partial diagram of a remote transceiver unit 8 according to another embodiment of the invention.

The circuit comprises, in addition to the components described with reference to FIGS. 5 and 9, a LED LD that enables to visually check the state of probe 4 and indicate the presence of noises, and a connection section SC that includes: a programming unit DS, for example a manually operated switch (or "dip switch") with two selectors, more specifically switches SW1 and SW2, three resistors RES3, RES4, RES5, a comparator C4 for comparing the signal at its input with a threshold value VTH5, and a field effect transistor MF2. Furthermore, FIG. 10 schematically shows the detecting devices 13 (i.e. a microswitch) and the associated connections to the connection section SC.

When switch SW2 is open (it can be operated, for example, in a manual way) and the apparatus is transmitting, the turning on of LED LD monitors the deflection of arm 7 as a consequence of contact between feeler 6 and a piece 1. In fact, when arm 7 is not deflected (there is no contact between feeler 6 and piece 1), microswitch 13 is closed: in this condition, the signal at the non-inverting input of comparator C4 is low, thus, transistor MF2 is held off and LED LD is off.

On the contrary, when arm 7 is deflected, microswitch 13 is open and thus at the non-inverting input of comparator C4 there is a signal that exceeds the threshold value VTH5 and enables transistor MF2 to conduct. In this case, the voltage at the ends of LED LD causes its turning on for visually displaying that contact between feeler 6 and the surface of piece 1 has taken place. The voltage at the output of comparator C4 is also sent to logic L, that detects that contact has taken place and accordingly drives the circuits T for generating and transmitting optical signals.

If switch SW2 is closed, when the logic is powered (signal A is at high logic level), transistor MF2 conducts and LED LD is on, regardless of the condition of microswitch 13. Switch SW2 can be turned off in the phase of assembly and setting up of probe 4 on machine tool 2 for the purpose of allowing to visually check through LED LD whether, in the specific position in which the probe will be mounted on the machine tool, the remote transceiver unit 8 is subject to noises. In fact, in this phase the only cause of the supply of power to logic L (signal VA is at high logic level), that can be identified by the turning on of LED LD, is noises. In the event this occurs, switch SW1 can be turned off (for example, it can be manually operated), the latter allows signals to be sent to amplifier A2 and to the additional filtering unit FA for enabling the associated automatic sensitivity control and "asimmetric" filtering functions. After a specific time has elapsed from the start of the noise signal, as a consequence of the switching of signal VA to low logic level, the turning off of LED LD visually monitors that the circuit has provided an efficacious protection against the noises.

When the setting up phase ends, switch SW2 is opened so LED LD can continue to visually monitor the condition of arm 7 of probe 4. On the contrary, switch SW1 can be either turned off or on depending on whether—on the basis of the detections made in the setting up phase—it be considered advisable to enable the automatic sensitivity control and "asimmetric" filtering functions for limiting the power supply time periods of logic L and minimize unwanted consumption of energy of battery 12 and the risk of unwanted activations and deactivations.

Thus, the so far described embodiments of the remote transceiver unit 8 enable, in a particularly simple and efficacious way, to achieve substantially negligible unwanted consumptions of energy of battery 12 due, for example, to noise signals that can be emitted by fluorescent lamps, and reduce practically to zero the probability that these noise signals be the cause of an accidental activation or deactivation of probe 4.

Obviously, the components of unit 8, herein described and illustrated in an extremely schematic way, can be achieved in various known ways without departing from the scope of the present invention. This also applies to the other units and components shown in the figures, as, for example, the detecting devices 13, which can include switches or transducers of a known type.

Systems including other aspects with respect to what is herein described, as for example, insofar as the attributes of the activation and deactivation signals identified by the logic are concerned also fall within the scope of the invention. These attributes may include specific codings of the signals, not necessarily bound to frequency and/or duration (number of pulses) of the signals.

Furthermore, even though the figures and the associated description refer to a transceiver system of infrared signals, the present invention can be applied—without substantial modifications—to systems that transmit signals at other frequencies, for example in the radio frequency range.

What is claimed is:

1. A system for detecting linear dimensions of a workpiece comprising:

a checking probe with detecting devices;

a power supply connected to the checking probe;

a remote transceiver unit, integral with the probe, connected to the detecting devices and to the power supply, and adapted for wireless transmission of signals indicative of the state of the probe; and a stationary transceiver unit, adapted for wireless transmission of activation signals to said remote transceiver unit, the remote transceiver unit comprising receiving devices adapted for receiving the wireless transmitted signals, a processing section connected to the receiving devices and to the power supply and adapted for generating an enable signal, a switching unit connected to the processing section and to the power supply, and additional sections connected to the switching unit, the switching unit being adapted for receiving the enable signal and, on the basis of this signal, controlling the power supply of at least one of said additional sections, wherein the processing section includes attenuation devices adapted for inhibiting the generation of the enable signal based on attributes of the signals that the receiving devices have received.

2. The system according to claim 1, wherein said attenuation devices include at least a delay generator for enabling the generation of the enable signal as the attributes of the signals received by the receiving devices vary, and for inhibiting the generation of said enable signal after a predetermined delay time based on said attributes.

3. The system according to claim 1, wherein the processing section includes at least a first amplifier connected to the receiving devices for generating an amplified signal, and the attenuation devices include elements of a feedback circuit for attenuating the intensity of the amplified signal.

4. The system according to claim 3, wherein the receiving devices are adapted for transmitting a periodic signal to said first amplifier, said feedback circuit being connected to the input of said first amplifier for reducing the amplitude of said periodic signal based on the amplitude of the amplified signal.

5. The system according to claim 3, wherein said additional sections of the remote transceiver unit include a logic processing unit, the switching unit being connected to the logic processing unit for connecting the power supply to the logic processing unit.

6. The system according to claim 5, wherein the remote transceiver unit includes an enable device connected to the processing section and to the logic processing unit and adapted for receiving said enable signal for enabling the transmission to the logic processing unit of a processed signal with attributes that match those of the signal received by the receiving devices.

7. The system according to claim 6, wherein said attributes of the processed signal include frequency and duration.

8. The system according to claim 7, wherein said processing section includes a first comparator connected to said first amplifier and adapted for providing said processed signal, a first low pass filter connected to the first comparator, a second comparator connected to said first low pass filter and adapted for providing said enable signal, the elements of the feedback circuit including a second low pass filter connected to the first comparator, a second amplifier connected to the second low pass filter, and an attenuation unit connected to the output of the second amplifier and to the input of said first amplifier.

9. The system according to claim 8, wherein said attenuation unit includes a field effect transistor.

10. The system according to claim 3, wherein said processing section includes a first comparator connected to said first amplifier and adapted for generating a processed signal, a first low pass filter connected to the first comparator, and a second comparator adapted for receiving a signal from said at least one low pass filter and providing said enable signal, the attenuation devices including an additional filtering unit connected between the first and the second comparator, in parallel to said first low pass filter, and adapted for altering the signal received by said second comparator for detecting interruptions in the processed signal.

11. The system according to claim 1, wherein said stationary transceiver unit and said remote transceiver unit are adapted for transmitting and receiving optical radiations.

12. The system according to claim 11, wherein said stationary transceiver unit and said remote transceiver unit are adapted for transmitting and receiving optical radiations in the infrared range.

13. The system according to claim 12, wherein the receiving devices include at least a photodiode adapted for receiving infrared radiations and generating a corresponding alternating signal, the processing section of the remote transceiver unit being adapted for processing said alternating signal for generating the enable signal.

14. The system according to claim 1, wherein the remote transceiver unit includes an LED and a coupling section between the LED, the switching unit and the detecting devices, said coupling section including a programming unit with at least a switch, the LED being adapted for visually and alternatively indicating modifications in the state of the probe or the power supply condition of the probe.

15. The system according to claim 14, wherein the programming unit is of the manually operated type and includes at least an additional switch, connected to the switching unit and to the attenuation devices, for enabling or inhibiting said attenuation devices.

16. The system according to claim 1, wherein said attenuation devices include at least a delay generator for enabling the generation of the enable signal as the attributes of the signals received by the receiving devices vary, and for inhibiting the generation of said enable signal after a predetermined delay time based on said attributes, and wherein the processing section includes at least a first amplifier connected to the receiving devices for generating an amplified signal, and the attenuation devices include elements of a feedback circuit for attenuating the intensity of the amplified signal.

17. The system according to claim 16, wherein the receiving devices are adapted for transmitting a periodic signal to said first amplifier, said feedback circuit being connected to the input of said first amplifier for reducing the amplitude of said periodic signal based on the amplitude of the amplified signal.

18. The system according to claim 16, wherein said additional sections of the remote transceiver unit include a logic processing unit, the switching unit being connected to the logic processing unit for connecting the power supply to the logic processing unit.

19. The system according to claim 18, wherein the remote transceiver unit includes an enable device connected to the processing section and to the logic processing unit and adapted for receiving said enable signal for enabling the transmission to the logic processing unit of a processed signal with attributes that match those of the signal received by the receiving devices.

20. The system according to claim 19, wherein said attributes of the processed signal include frequency and duration.

21. The system according to claim 20, wherein said processing section includes a first comparator connected to said first amplifier and adapted for providing said processed signal, a first low pass filter connected to the first comparator, a second comparator connected to said first low pass filter and adapted for providing said enable signal, the elements of the feedback circuit including a second low pass filter connected to the first comparator, a second amplifier connected to the second low pass filter, and an attenuation unit connected to the output of the second amplifier and to the input of said first amplifier.

22. The system according to claim 21, wherein said attenuation unit includes a field effect transistor.

23. The system according to claim 16, wherein said processing section includes a first comparator connected to said first amplifier and adapted for generating a processed signal, a first low pass filter connected to the first comparator, and a second comparator adapted for receiving a signal from said at least one low pass filter and providing said enable signal, the attenuation devices including an additional filtering unit connected between the first and the second comparator, in parallel to said first low pass filter, and adapted for altering the signal received by said second comparator for detecting interruptions in the processed signal.

* * * * *

UNITED STATES PATENT AND TRADEMARK OFFICE
CERTIFICATE OF CORRECTION

PATENT NO.    : 6,526,670 B2
DATED         : March 4, 2003
INVENTOR(S)   : Carlo Carli It is certified that error appears in the above-identified patent and that said Letters Patent is hereby corrected as shown below:

Column 8,
Line 57, "F" should read -- "F1" --, and "asiimetric" should read -- "asimmetric" --.

Signed and Sealed this

Eighth Day of July, 2003

JAMES E. ROGAN
*Director of the United States Patent and Trademark Office*